US011420299B2

(12) United States Patent
Choi et al.

(10) Patent No.: US 11,420,299 B2
(45) Date of Patent: Aug. 23, 2022

(54) AUTOMATIC BOLT FASTENING DEVICE USING TWO-ARM SCARA ROBOT

(71) Applicant: J-rem Co., Ltd., Suwon-si (KR)

(72) Inventors: Jin Seok Choi, Gunpo-si (KR); Kwang Geun Choi, Hwaseong-si (KR)

(73) Assignee: J-rem Co., Ltd., Suwon-si (KR)

( * ) Notice: Subject to any disclaimer, the term of this patent is extended or adjusted under 35 U.S.C. 154(b) by 0 days.

(21) Appl. No.: 17/173,600

(22) Filed: Feb. 11, 2021

(65) Prior Publication Data
US 2022/0063030 A1 Mar. 3, 2022

(30) Foreign Application Priority Data

Aug. 28, 2020 (KR) .................... 10-2020-0109242

(51) Int. Cl.
| | |
|---|---|
| *B23P 19/00* | (2006.01) |
| *B23P 19/06* | (2006.01) |
| *B25J 11/00* | (2006.01) |
| *B25J 15/06* | (2006.01) |
| *B25J 9/04* | (2006.01) |
| *B25J 9/00* | (2006.01) |

(52) U.S. Cl.
CPC ........... *B23P 19/006* (2013.01); *B23P 19/007* (2013.01); *B23P 19/06* (2013.01); *B25J 9/043* (2013.01); *B25J 11/005* (2013.01); *B25J 15/0616* (2013.01); *B25J 9/0093* (2013.01)

(58) Field of Classification Search
CPC ............ B23P 19/06; B23P 19/001–002; B23P 19/006; B25J 9/0084; B25J 9/0087; B25J 9/0093; B25J 9/043; B25J 9/06; B25J 11/005; B25J 15/0028; B25J 15/0616; B25B 21/00
See application file for complete search history.

(56) References Cited

FOREIGN PATENT DOCUMENTS

| KR | 20-0453575 Y1 | 5/2011 | | |
|---|---|---|---|---|
| WO | WO-2020241900 A1 | * | 12/2020 | .............. B25J 13/00 |

OTHER PUBLICATIONS

Translation of WO-2020241900 (Year: 2020).*

* cited by examiner

Primary Examiner — Matthew P Travers
(74) Attorney, Agent, or Firm — Paratus Law Group, PLLC

(57) ABSTRACT

Disclosed is an automatic bolt fastening device which includes a main body frame, a lower arm installed in the main body frame to be rotatable in a rightward-leftward direction, a gripper installed in a tip portion of the lower arm to pick up the bolt from a bolt feeder, an upper arm installed in the main body frame on an upper side of the lower arm to be rotatable in the rightward-leftward direction, and a bolt fastener installed in a tip portion of the upper arm to be movable upward and downward, and fastening the bolt to the workpiece located on the assembly line after being moved to the assembly line by the upper arm in a state where the bolt fastener vacuum-suctions the bolt picked up by the gripper.

6 Claims, 19 Drawing Sheets

A-A

AUTOMATIC BOLT FASTENING DEVICE USING TWO-ARM SCARA ROBOT

CROSS-REFERENCE TO RELATED APPLICATION

This application claims priority to Korean Patent Application No. 10-2020-0109242 filed on Aug. 28, 2020, which is hereby incorporated by reference in its entirety.

BACKGROUND

The present disclosure relates to an automatic bolt fastening device, and particularly relates to an automatic bolt fastening device which can considerably reduce a time required for fastening bolts while the bolts are stably fastened by using a two arm scara robot to independently and simultaneously perform a process of picking up the bolt from a bolt feeder and a process of fastening the bolt to a workpiece.

In general, assembly lines of industrial products are mainly used to carry out work for fastening bolts, and a process of fastening the bolt in each of the assembly lines is mostly automated.

As disclosed in Korean Utility Model Publication No. 0453575 (May 3, 2011), a method widely used for fastening the bolt in each of the assembly lines is a method in which a bolt to be fastened is fastened to a workpiece after a vacuum suction pipe vacuum-suctions the bolt.

When the vacuum suction pipe is used in this way, the following operations are repeatedly performed. The vacuum suction pipe vacuum-suctions the bolt from a bolt feeder by using a scara robot, moves to the workpiece on the assembly line, fastens the bolt, moves again to the bolt feeder, and vacuum-suctions the bolt.

According to the related art, the vacuum suction pipe fastens the bolt to the workpiece after moving the bolt in a state where a lower end portion of the vacuum suction pipe vacuum-suctions the bolt. Accordingly, there is an advantage in that the bolt is stably fastened without any problem such as inclination of the bolt.

However, in a case of the bolt fastening by using the vacuum suction pipe, although there is the advantage in that the bolt can be stably fastened, there is a disadvantage as follows. The vacuum suction pipe vacuum-suctions the bolt in a state where the vacuum suction pipe is exactly located at the bolt feeder. Subsequently, after the vacuum suction pipe moves to the workpiece on the assembly line, the vacuum-suctioned is fastened in a state where the vacuum suction pipe is exactly located at the workpiece, and the vacuum suction pipe moves to the bolt feeder again. In this way, the above-described processes has to be sequentially performed one by one. Consequently, it takes a lot of time in fastening the bolts.

SUMMARY

Therefore, the present disclosure is proposed to solve the above-described problems in the related art, and an object of the present disclosure is to provide an automatic bolt fastening device which can considerably reduce a time required for fastening bolts while the bolts are stably fastened by using a two arm scara robot to independently and simultaneously perform a process of picking up the bolt from a bolt feeder and a process of fastening the bolt to a workpiece.

According to a technical idea of the present disclosure, in order to achieve the above-described object, there is provided an automatic bolt fastening device capable of fastening a bolt to a workpiece located on an assembly line by receiving the bolt from a bolt feeder. The automatic bolt fastening device includes a main body frame, a lower arm installed in the main body frame to be rotatable in a rightward-leftward direction, a gripper installed in a tip portion of the lower arm to pick up the bolt from the bolt feeder, an upper arm installed in the main body frame on an upper side of the lower arm to be rotatable in the rightward-leftward direction, and a bolt fastener installed in a tip portion of the upper arm to be movable upward and downward, and fastening the bolt to the workpiece located on the assembly line after being moved to the assembly line by the upper arm in a state where the bolt fastener vacuum-suctions the bolt picked up by the gripper. A process of picking up the bolt from the bolt feeder by the gripper and a process of fastening the bolt to the workpiece by the bolt fastener are independently and simultaneously performed.

Herein, the gripper may include a vacuum gripper installed in a tip portion of an auxiliary arm installed on an upper surface of the tip portion of the lower arm to be rotatable in the rightward-leftward direction, and capable of vacuum-suctioning the bolt of the bolt feeder, and a jaw gripper installed on a lower surface of the tip portion of the lower arm, and capable of transferring the bolt to the bolt fastener by causing a pair of jaws provided in the tip portion to grip the bolt vacuum-suctioned by the vacuum gripper.

In addition, the auxiliary arm may be rotatable in the rightward-leftward direction by receiving a driving force of a first motor in a state where the auxiliary arm is supported by the tip portion of the lower arm to be movable upward and downward by a ball spline vertically coupled to a lower side of the auxiliary arm.

In addition, the automatic bolt fastening device may further include a buffer spring that elastically supports the ball spline.

In addition, the automatic bolt fastening device may further include a lifting unit that releases the bolt by lifting the vacuum gripper in a state where the jaw gripper grips the bolt vacuum-suctioned by the vacuum gripper. The lifting unit may include a pinion installed in a shaft of a second motor, a rack engaging with the pinion to linearly move, a slide member coupled to the rack to linearly move in a forward-rearward direction, a rail guiding the slide member to slide, a link joint having one end portion hinged on and coupled to a tip portion of the slide member, a lifting body hinged on and coupled to the other end portion of the link joint, and lifting the auxiliary arm while moving upward when the slide member moves forward and moving downward when the slide member moves rearward, and a guide rod vertically coupled to a lower side of the lifting body to guide lifting of the lifting body.

In addition, the slide member may include a rack coupler coupled to an upper surface of the rack, a right-left enlarged portion coupled to a tip portion of the rack coupler in a long form in the rightward-leftward direction, and a pair of sliding units respectively coupled to a left end portion and a right end portion of the right-left enlarged portion and formed to be long in the forward-rearward direction in a state where the sliding units are separated from each other. The rail, the link joint, and the guide rod may be provided in pairs on a right side and a left side to correspond to the sliding units. The first motor and a third motor which respectively provide power for the vacuum gripper and the jaw gripper are arranged in a space between the pair of sliding units separated from each other.

In addition, the upper arm and the lower arm include articulated arms that are respectively bendable.

In addition, there is provided an industrial product manufacturing system including a conveyor that conveys a workpiece to each assembly line, a bolt feeder that supplies a bolt, and the automatic bolt fastening device capable of fastening the bolt to the workpiece located on the assembly line by receiving the bolt supplied from the bolt feeder.

The automatic bolt fastening device according to the present disclosure can considerably reduce a time required for fastening the bolts while the bolts are stably fastened by using a two arm scara robot to independently and simultaneously perform a process of picking up the bolt from the bolt feeder and a process of fastening the bolt to the workpiece without sequentially performing the processes.

DETAILED DESCRIPTION

Figure 1:
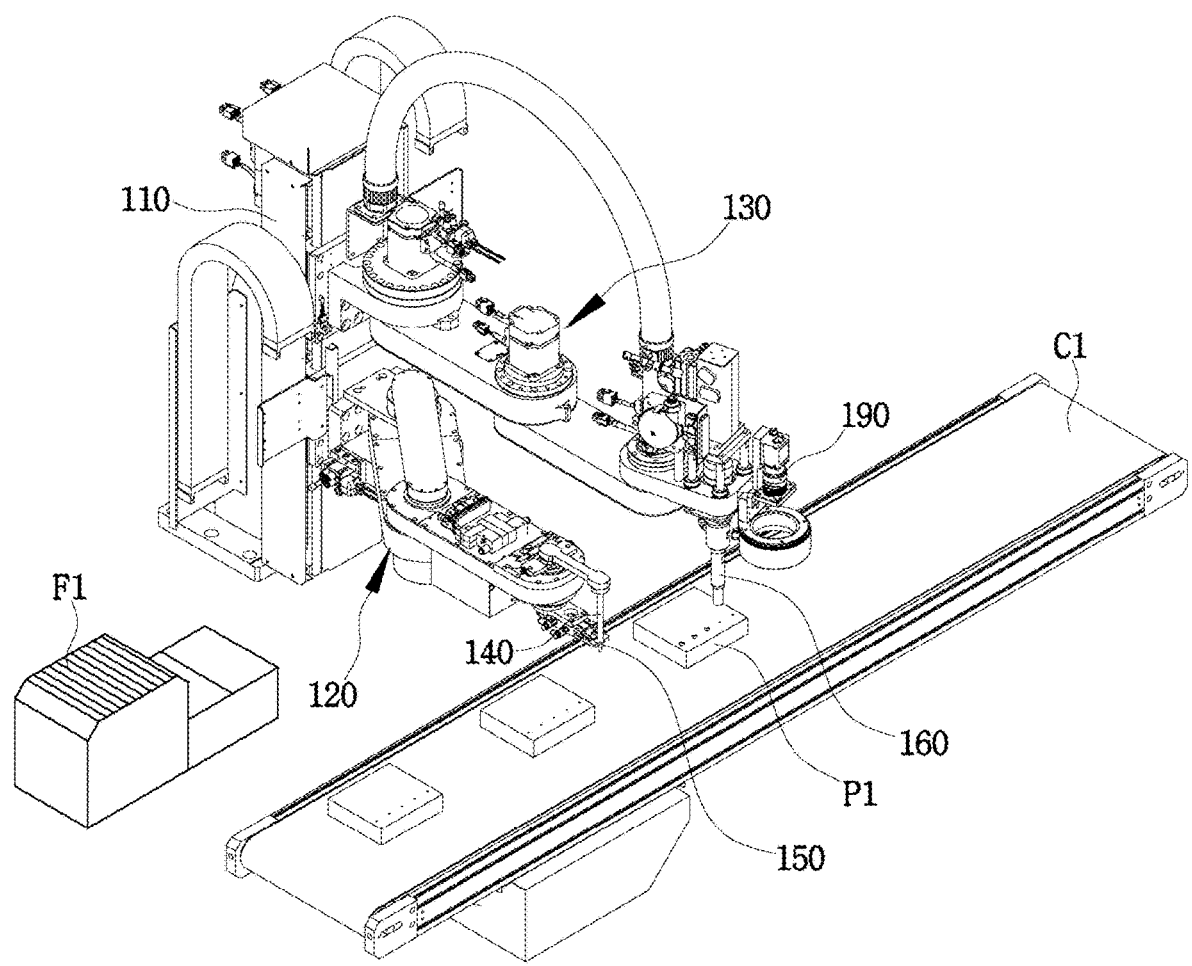
FIG. 1 is a view illustrating a use state of an automatic bolt fastening device according to an embodiment of the present disclosure.

An automatic bolt fastening device according to embodiments of the present disclosure will be described in detail with reference to the accompanying drawings. The present disclosure may be modified in various ways, and may have various forms. Specific embodiments will be illustrated in the drawings, and will be described herein in detail. However, the specific embodiments are not intended to limit the present disclosure to specific disclosure forms. It should be understood that the specific embodiments include all modifications, equivalents, or substitutes included in the spirit and scope of the present disclosure. In describing each drawing, similar reference numerals will be assigned to similar configuration elements. In the accompanying drawings, dimensions of structures are illustrated to be enlarged than actual dimensions in order to clarify the present disclosure, or to be reduced than actual dimensions in order to facilitate understanding of schematic configurations.

In addition, terms such as first and second may be used to describe various configuration elements. However, the configuration elements should not be limited by the terms. The terms are used only for the purpose of distinguishing one component from another component. For example, without departing from the scope of the present disclosure, a first configuration element may be referred to as a second component, and similarly, a second configuration element may be referred to as a first component. On the other hand, unless otherwise defined, all terms used herein, which include technical or scientific terms, have the same meaning as those generally understood by a person of ordinary skill in the technical field to which the present disclosure belongs. Terms as defined in a generally used dictionary should be interpreted as having meanings consistent with meanings in the context of the related technology, and should not be interpreted as ideal or excessively formal meanings, unless otherwise clearly defined in the present application.

Embodiments

Figure 2:
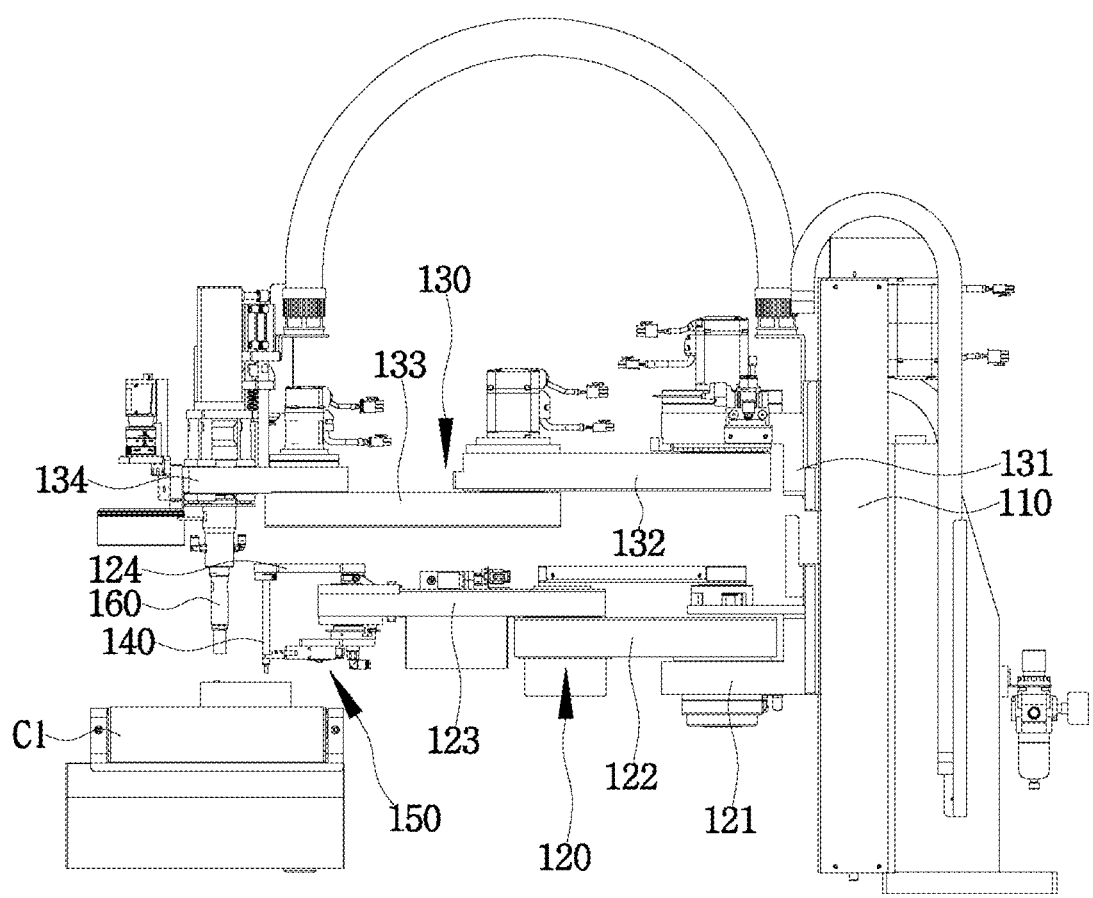
FIG. 2 is a side view of the automatic bolt fastening device according to the embodiment of the present disclosure.
Figure 3:
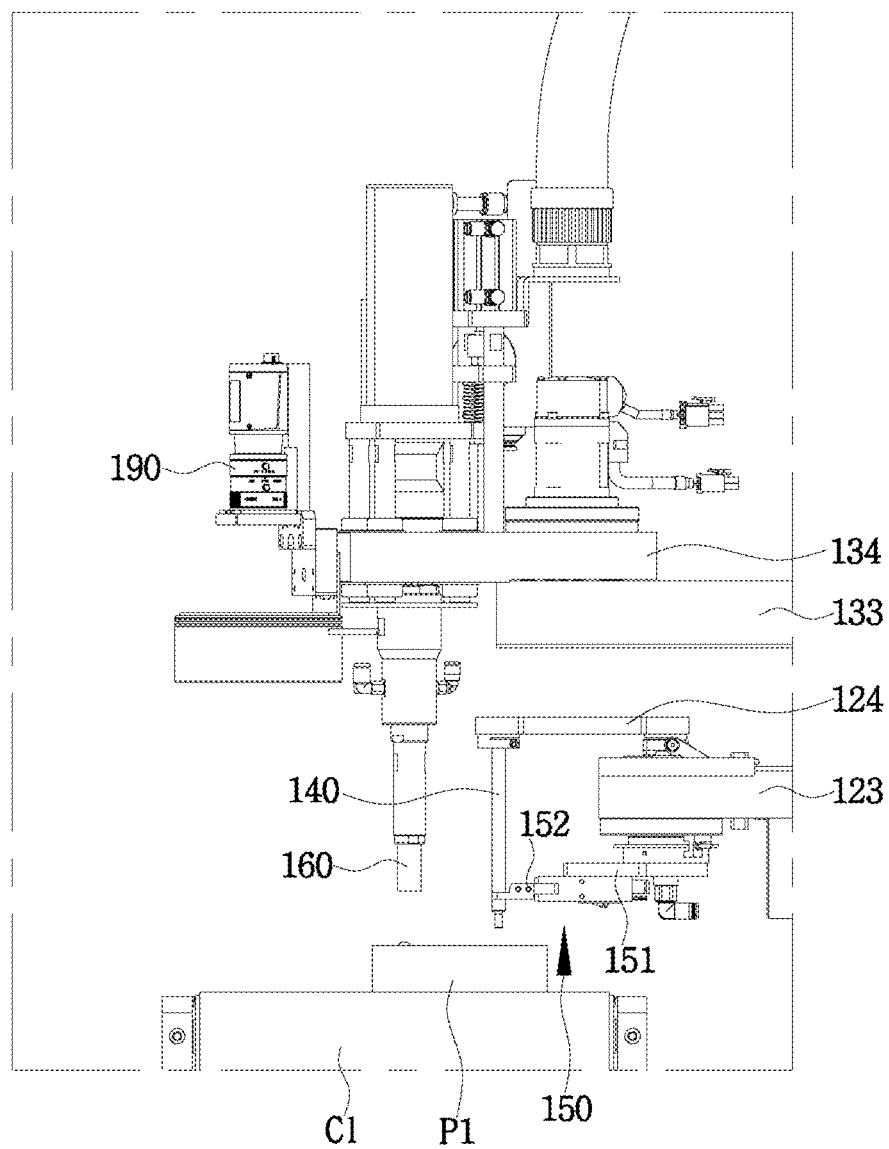
FIG. 3 is an enlarged view illustrating a main part in FIG. 2.
Figure 4:
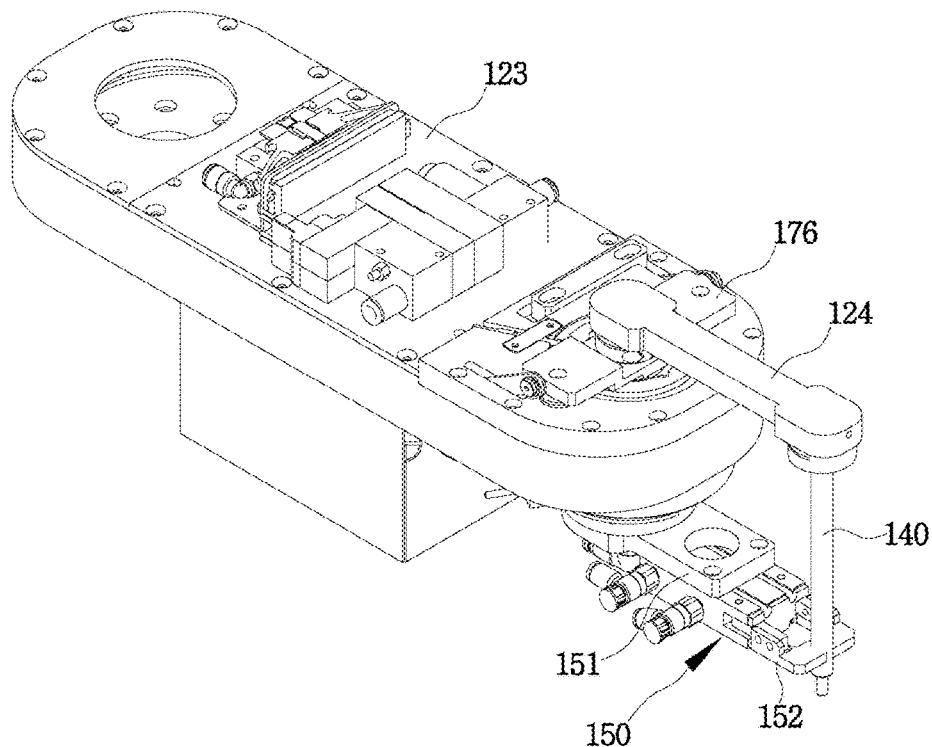
FIG. 4 is a partial perspective view of a lower arm in which a vacuum gripper and a jaw gripper are installed in the automatic bolt fastening device according to the embodiment of the present disclosure.
Figure 5:
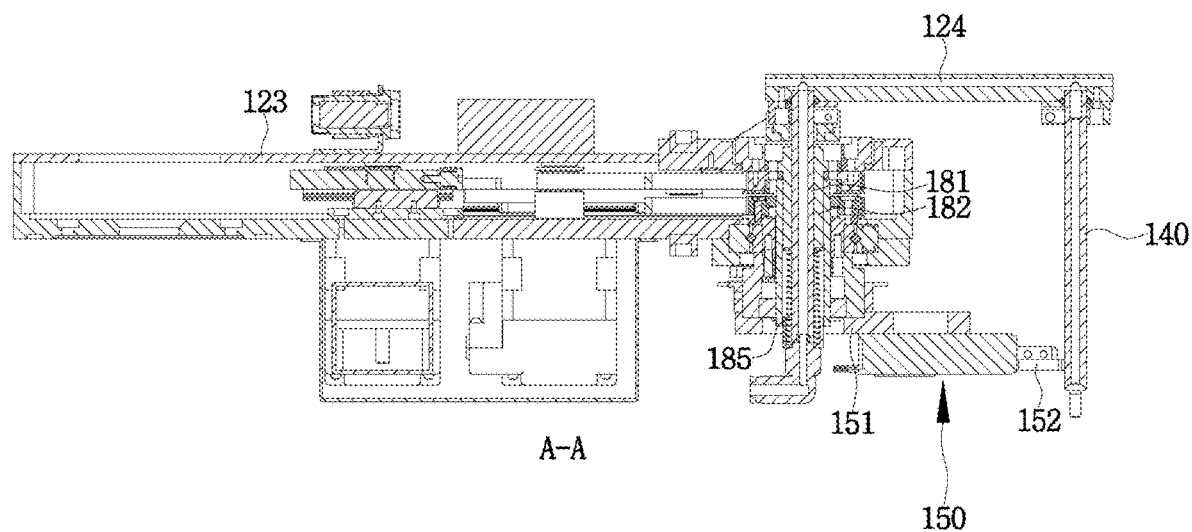
FIG. 5 is a reference diagram for describing an internal configuration of the lower arm in which the vacuum gripper and the jaw gripper are installed in the automatic bolt fastening device according to the embodiment of the present disclosure.

FIG. 1 is a view illustrating a use state of an automatic bolt fastening device according to an embodiment of the present disclosure. FIG. 2 is a side view of the automatic bolt fastening device according to the embodiment of the present disclosure. FIG. 3 is an enlarged view of a main part in FIG. 2. FIG. 4 is a partial perspective view of a lower arm in which a vacuum gripper and a jaw gripper are installed in the automatic bolt fastening device according to the embodiment of the present disclosure.

As illustrated in the drawings, the automatic bolt fastening device according to the embodiment of the present disclosure includes main configuration elements such as a main body frame 110, a lower arm 120, an upper arm 130, a vacuum gripper 140, a jaw gripper 150, and a bolt fastener 160. The present disclosure is configured to considerably reduce a time required for fastening bolts while the bolts are stably fastened by independently and simultaneously performing a process of picking up the bolt from a bolt feeder FI by using the main configuration elements and a process of fastening the bolt to a workpiece PI located on an assembly line by using a conveyor C1.

Hereinafter, the automatic bolt fastening device according to the embodiment of the present disclosure will be described in detail mainly with reference to the respective configuration elements.

The main body frame 110 serves to support the lower arm 120 and the upper arm 130 to be respectively movable upward and downward and rotatable in a rightward-leftward direction.

The lower arm 120 serves to move the vacuum gripper 140 and the jaw gripper 150 while both are supported by a tip portion, and includes an articulated arm. The lower arm 120 includes a lower lifting body 121 coupled to the main body frame 110 to be movable upward and downward, and a first lower arm 122 and a second lower arm 123 which are sequentially coupled to the lower lifting body 121 to be rotatable in the rightward-leftward direction. The vacuum gripper 140 is installed on an upper surface of the second lower arm 123 in a vertical form by an auxiliary arm 124, and the jaw gripper 150 having a pair of jaws 152 is installed on a lower surface of the second lower arm 123.

The upper arm 130 serves to move the vacuum gripper 140 while the vacuum gripper 140 is supported by the tip portion, and includes the articulated arm as in the lower arm 120. The upper arm 130 includes an upper lifting body 131 coupled to the main body frame 110 to be movable upward and downward, and a first upper arm 132, a second upper arm 133, and a third upper arm 134 which are sequentially coupled to the upper lifting body 131 to be rotatable in the rightward-leftward direction. The bolt fastener 160 is vertically installed on a lower side of the tip portion of the third upper arm 134. In addition, a vision 190 is installed on the upper side of the tip portion of the third upper arm 134 to confirm a fastening point between the bolt and the workpiece. In this manner, the vision 190 assists the bolt fastener 160 to accurately carry out fastening work.

Figure 9:
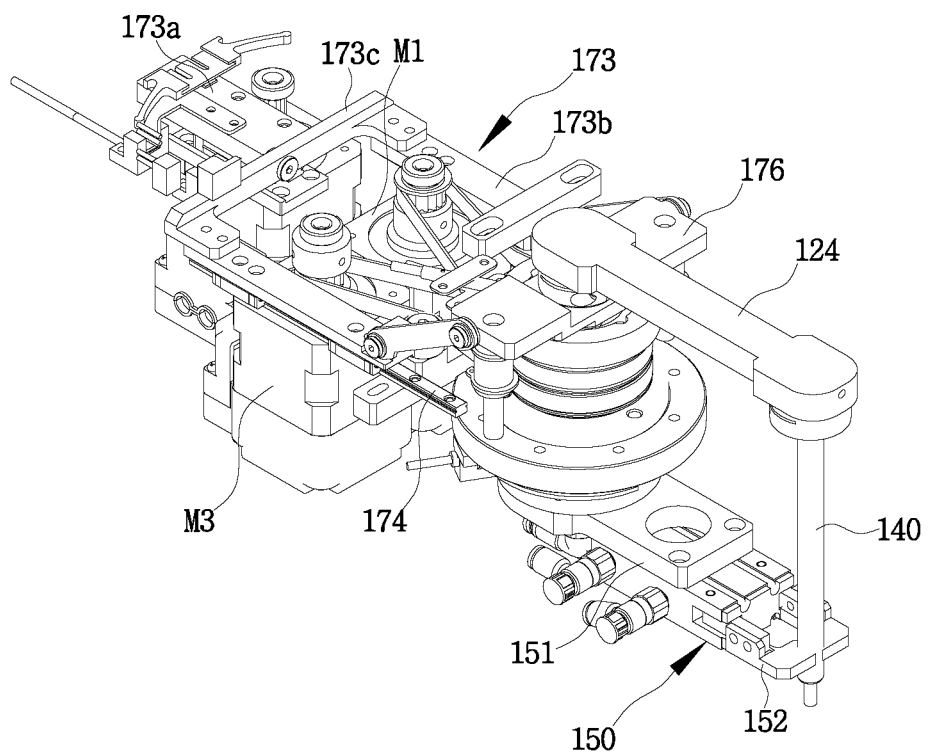
FIG. 9 is a cross-sectional view taken along line A-A in FIG. 7.

The vacuum gripper 140 serves to pick up the bolt from the bolt feeder, and is provided in a form of a vacuum suction pipe that suctions the bolt by using vacuum pressure. The vacuum gripper 140 is vertically installed in a downward direction from the tip portion of the auxiliary arm 124 installed to be rotatable in the rightward-leftward direction on the upper surface of the tip portion of the lower arm 120. When an internal structure of the vacuum gripper 140 is viewed, as illustrated in the cross-sectional views in FIGS. 9 and 10, the internal structure is formed to be hollow so that a lower end portion of the vacuum gripper 140 can vacuum-suction the bolt. In this manner, the vacuum gripper 140 is connected to a vacuum pump.

Figure 10:
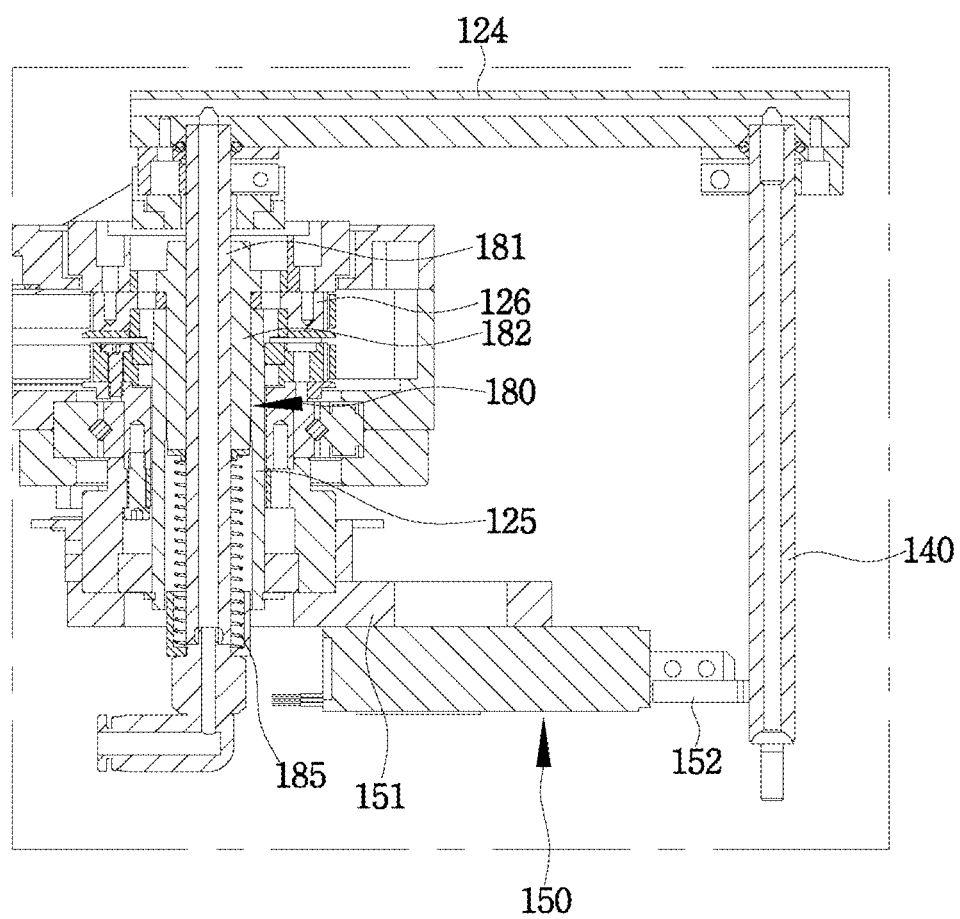
FIG. 10 is a partially enlarged view of a main part in FIG. 9.
Figure 11A:
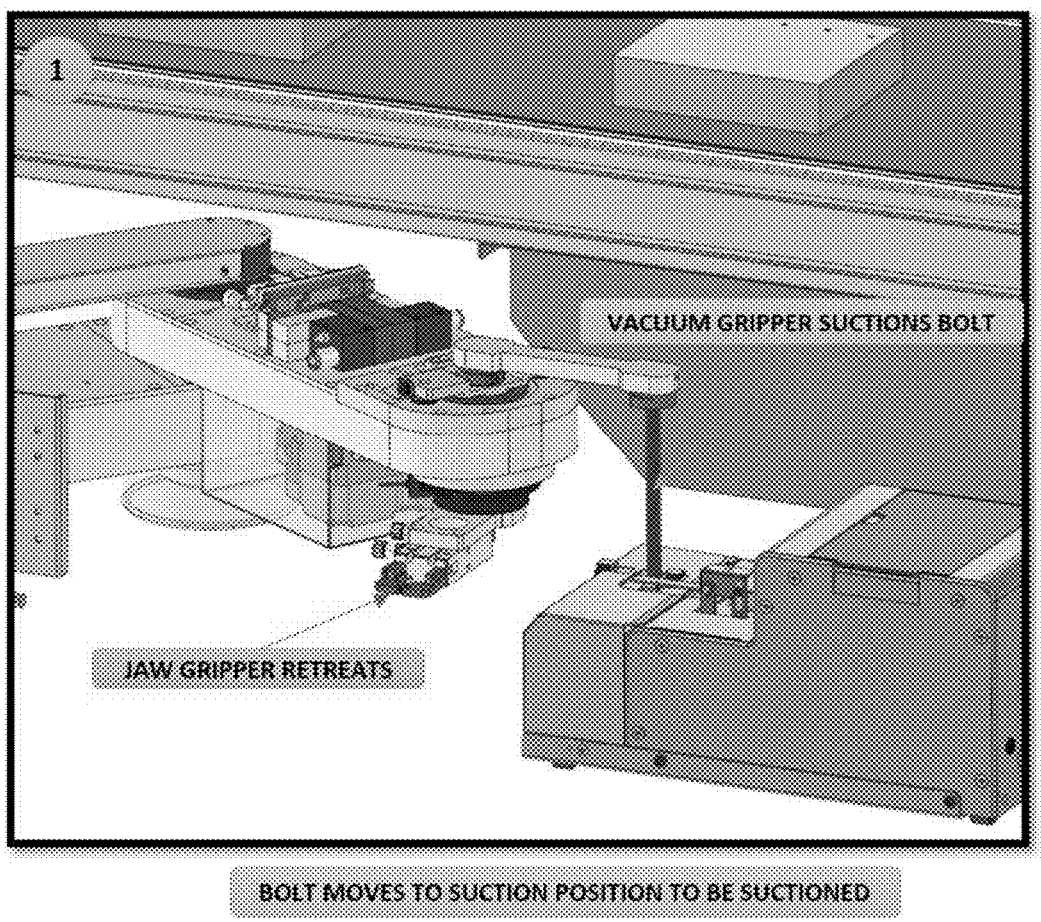
FIGS. 11A to 11L sequentially illustrate bolt movement and fastening work.
Figure 11B:
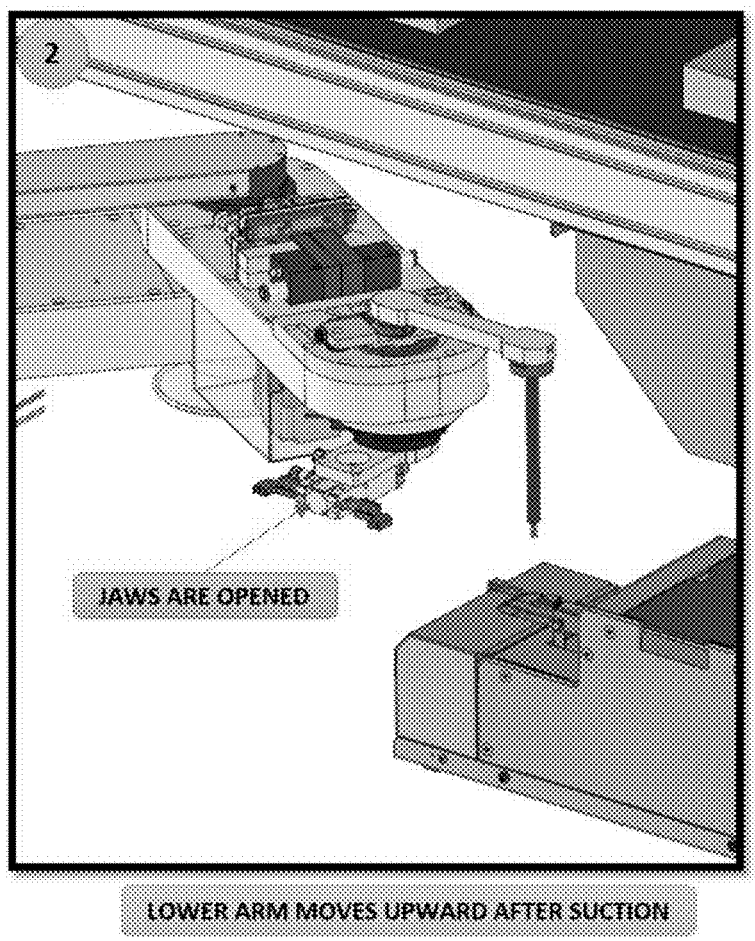
Figure 11C:
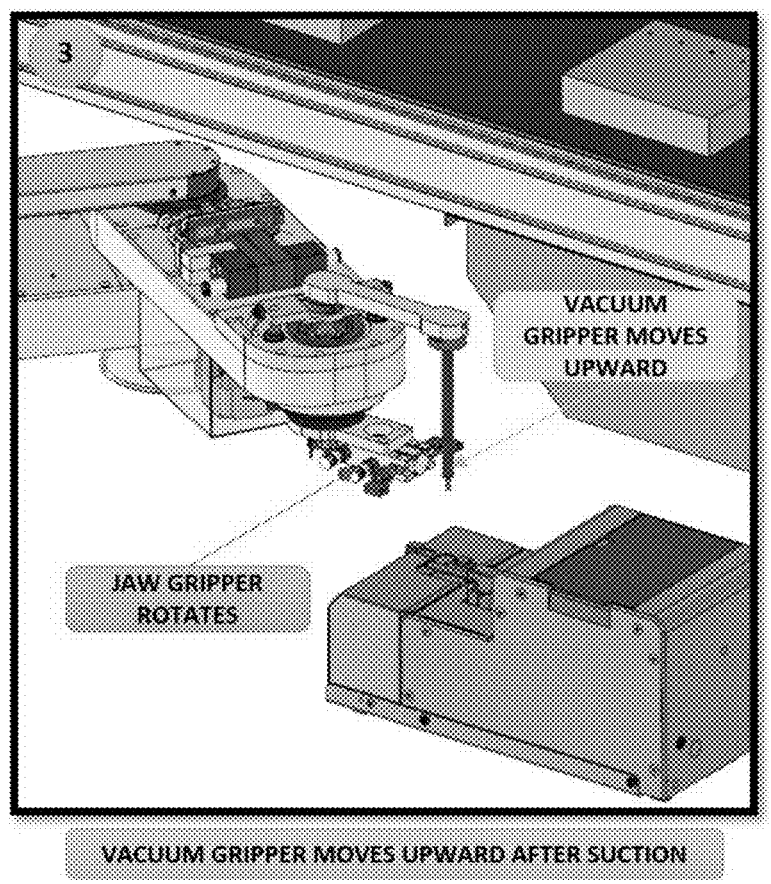
Figure 11D:
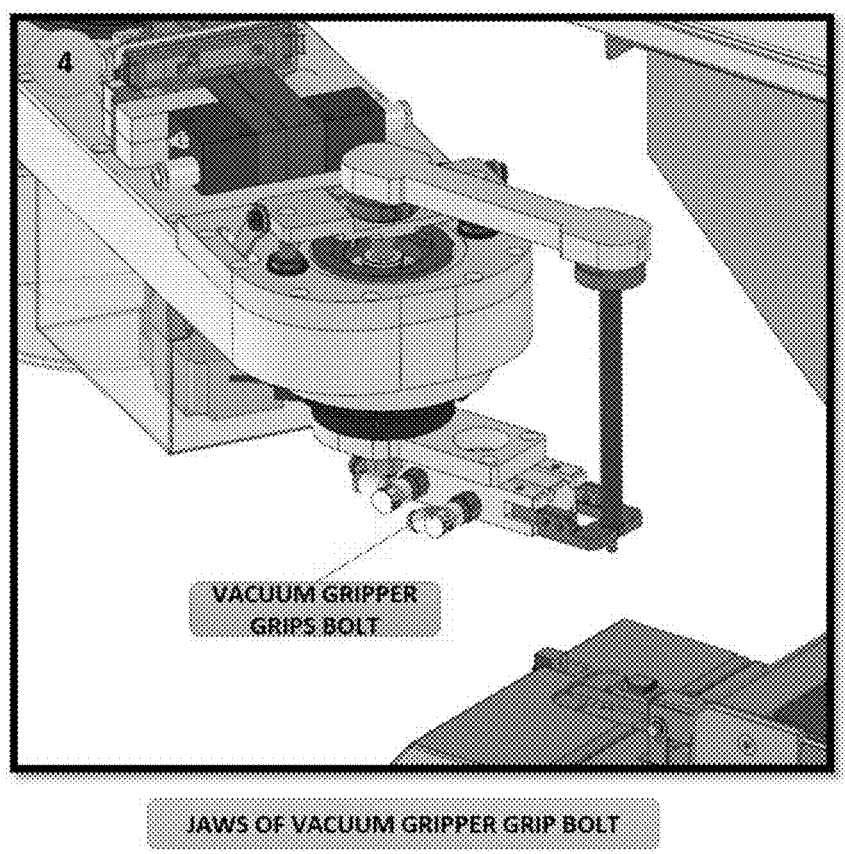
Figure 11E:
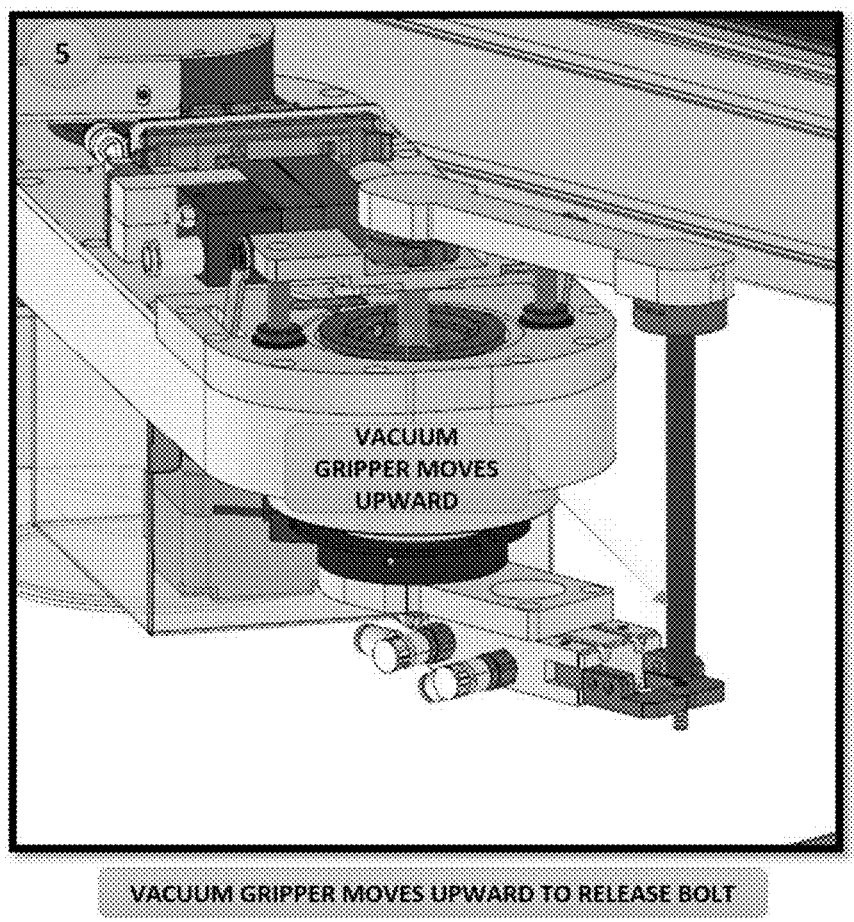
Figure 11F:
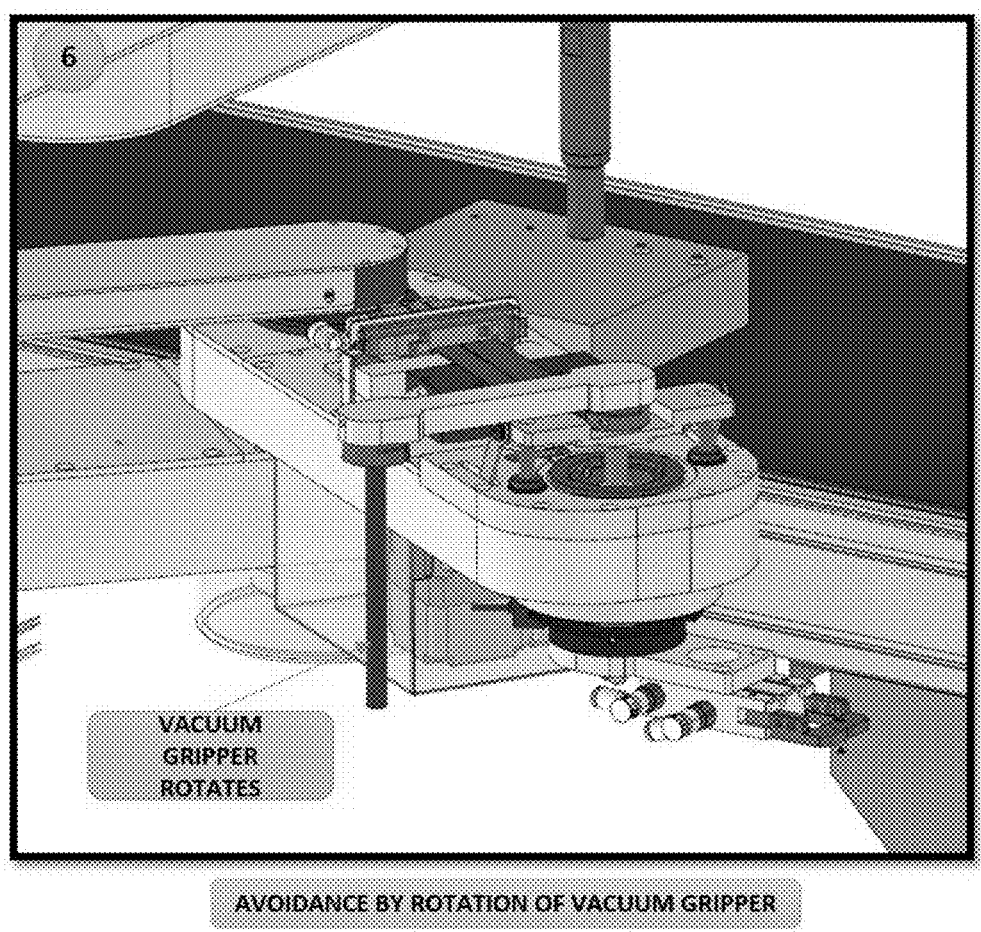
Figure 11G:
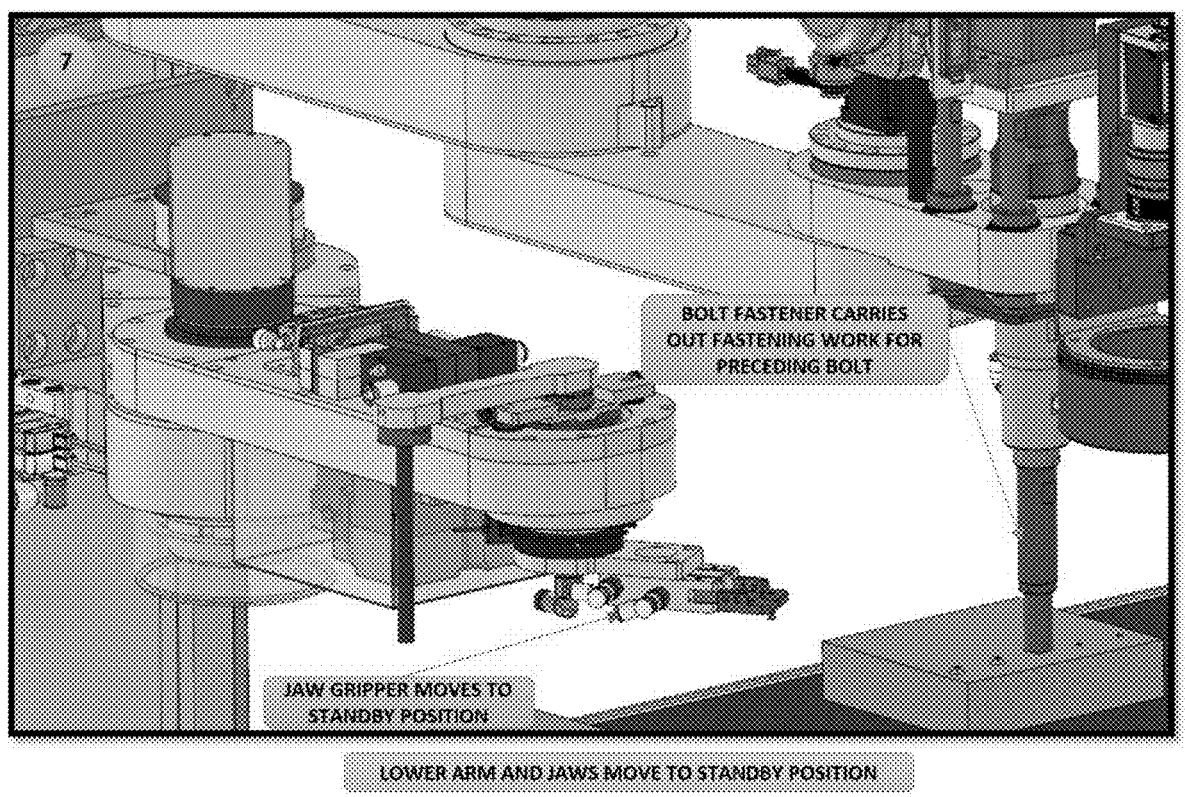
Figure 11H:
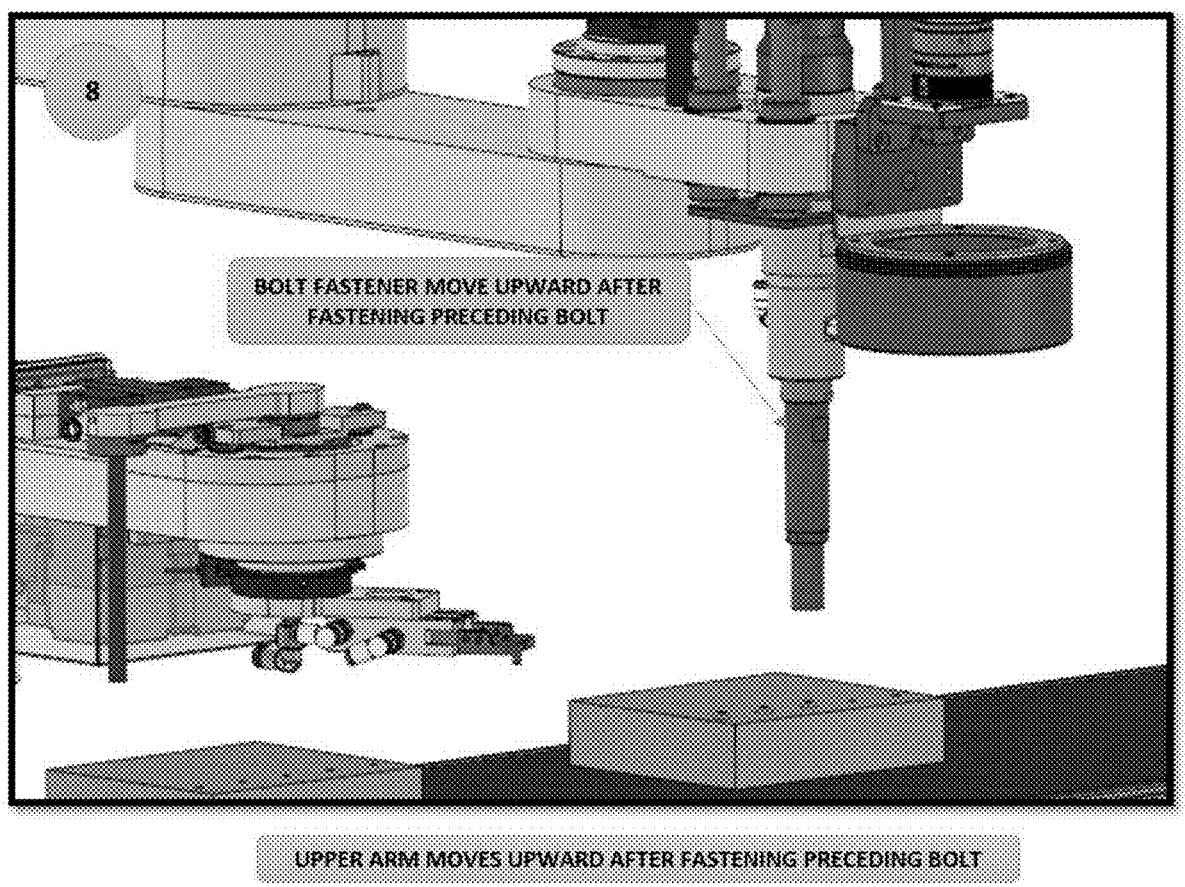
Figure 11I:
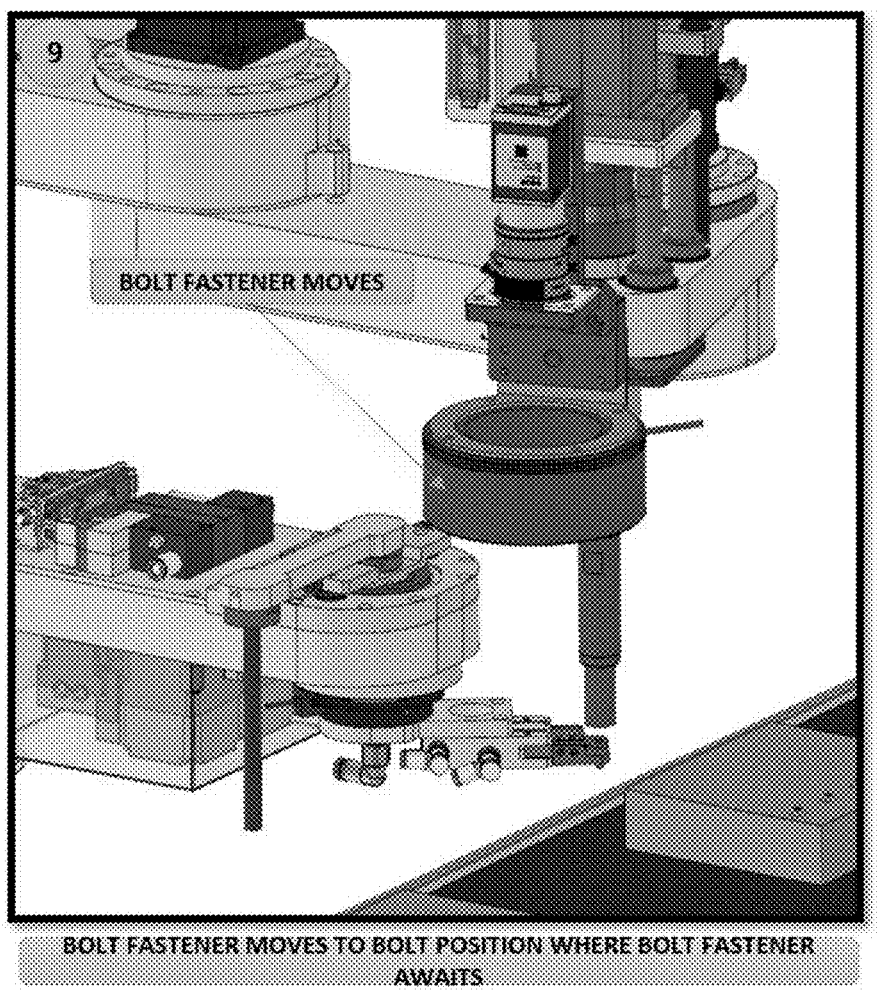
Figure 11J:
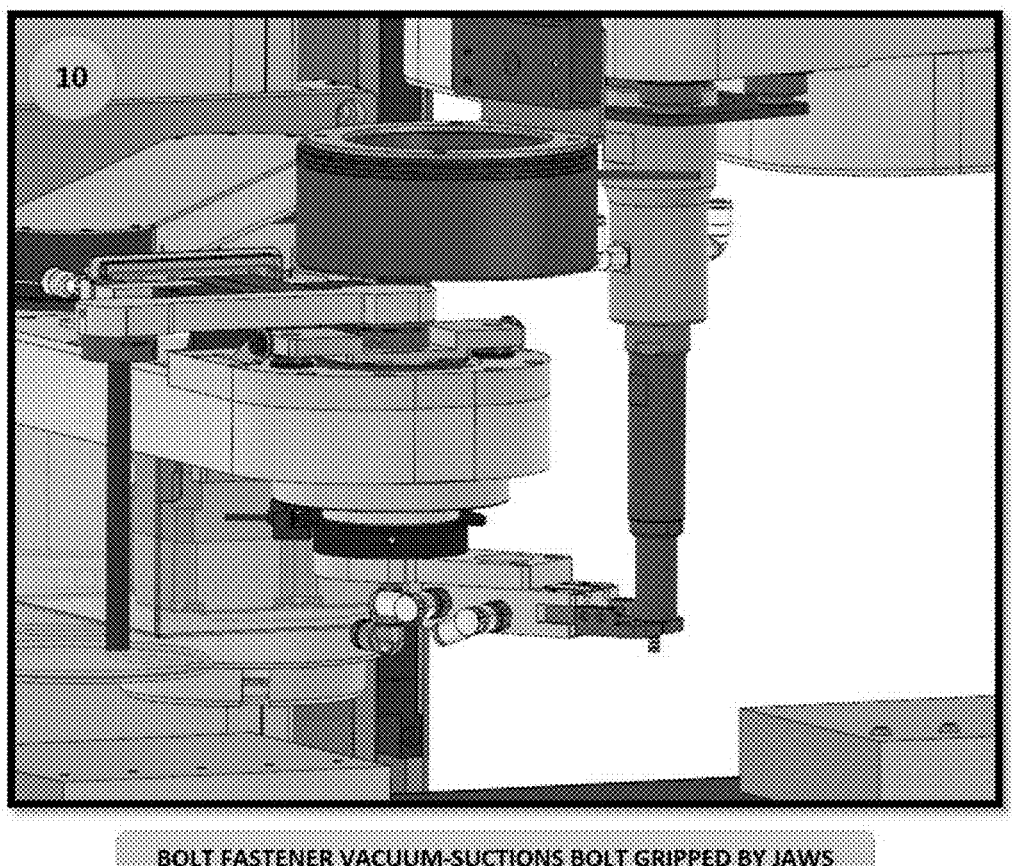
Figure 11K:
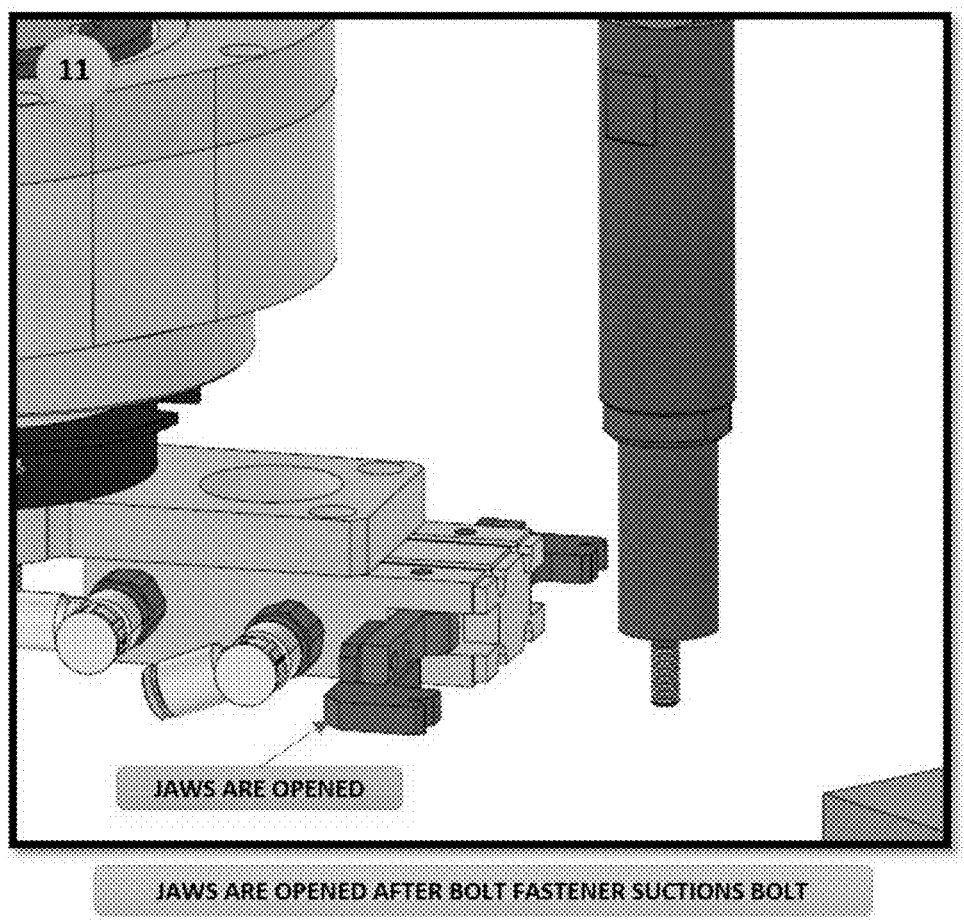
Figure 11L:
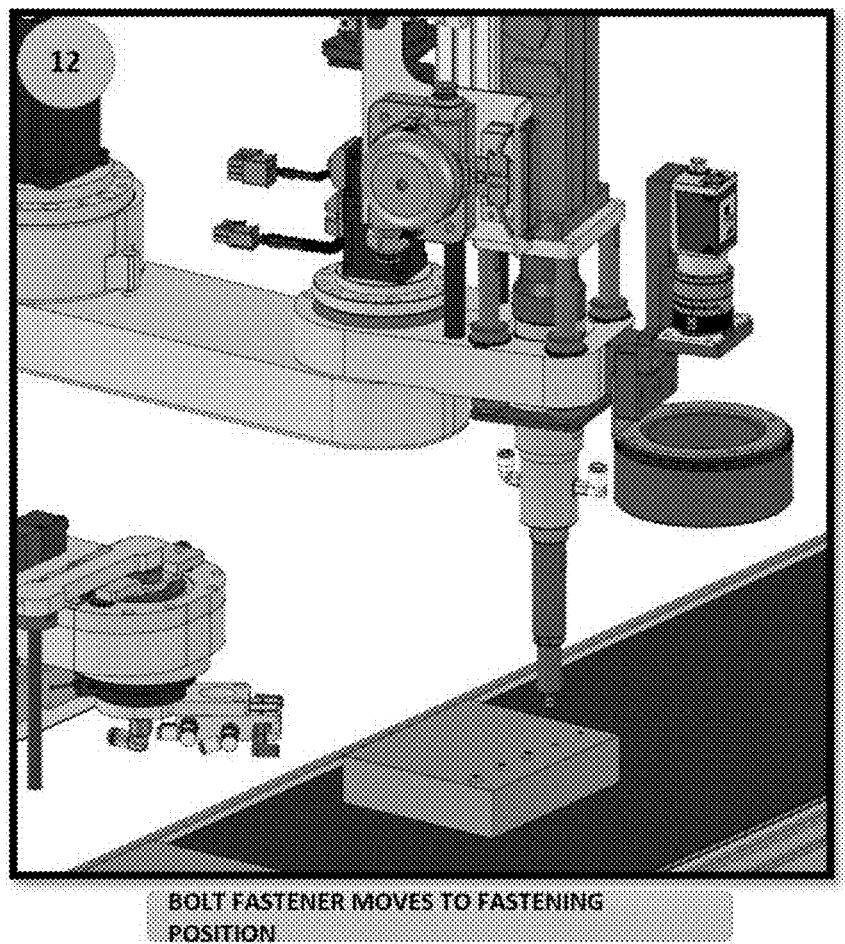

Here, the auxiliary arm 124 supporting the vacuum gripper 140 is installed to be rotatable in the rightward-leftward direction by receiving a driving force of a first motor M1 in a state where the auxiliary arm 124 is supported to be movable upward and downward in the tip portion of the lower arm 120 by a ball spline 180 vertically coupled to the lower side as illustrated in FIG. 10. The ball spline 180 is configured so that a hollow vertical shaft 181 and a nut 182 are coupled to each other. A buffer spring 185 is additionally installed in an inserted form in a lower portion of the vertical shaft 181 of the ball spline 180 to elastically support the nut 182 of the ball spline 180 from the lower side. In this manner, it is possible to attenuate vibrations and shocks which are generated due to a lifting operation of the ball spline 180 moving upward and downward in association with a lifting operation of the vacuum gripper 140.

When a pinion 126 is rotated by the first motor M1, a rotational operation of the vacuum gripper 140 is transmitted so that a rotary shaft 125, the nut 182 of the ball spline 180, the vertical shaft 181 which are sequentially connected to the pinion 126 are rotated, and the auxiliary arm 124 coupled to an upper end portion of the vertical shaft 181 is rotated.

The jaw gripper 150 is installed on the lower surface of the tip portion of the lower arm 120 to be rotatable in the rightward-leftward direction, and serves to transfer the bolt to the bolt fastener 160 in such a way that a pair of jaws 152 provided in the tip portion grips the bolt vacuum-suctioned by the vacuum gripper 140. The jaw gripper 150 includes a gripper main body 151 coupled to be rotatable on the lower surface of the tip portion of the lower arm 120 and rotating by receiving power from a third motor M3, and the pair of jaws 152 installed in the tip portion of the gripper main body 151 so that the bolt can be gripped while opening and closing the pair of jaws 152 rightward and leftward. When the jaw gripper 150 is provided, the vacuum gripper 140 picking up the bolt from the bolt feeder by vacuum suction can smoothly transfer the bolt to the bolt fastener 160 which fastens the bolt to the workpiece on the assembly line by vacuum suction in a state where the bolt is vacuum-suctioned.

Here, it is preferable that the pair of jaws 152 is installed to be openable by 180 degrees or larger therebetween. In this manner, when the vacuum gripper 140 is moved by the rotation of the auxiliary arm 124 in the rightward-leftward direction, the pair of jaws 152 can be prevented from interfering with each other by bringing the pair of jaws 152 into a maximum opened state.

On the other hand, a lifting unit 170 is installed which can release the bolt by moving the vacuum gripper 140 slightly upward in a state where the jaw gripper 150 grips the bolt vacuum-suctioned by the vacuum gripper 140.

Figure 6:
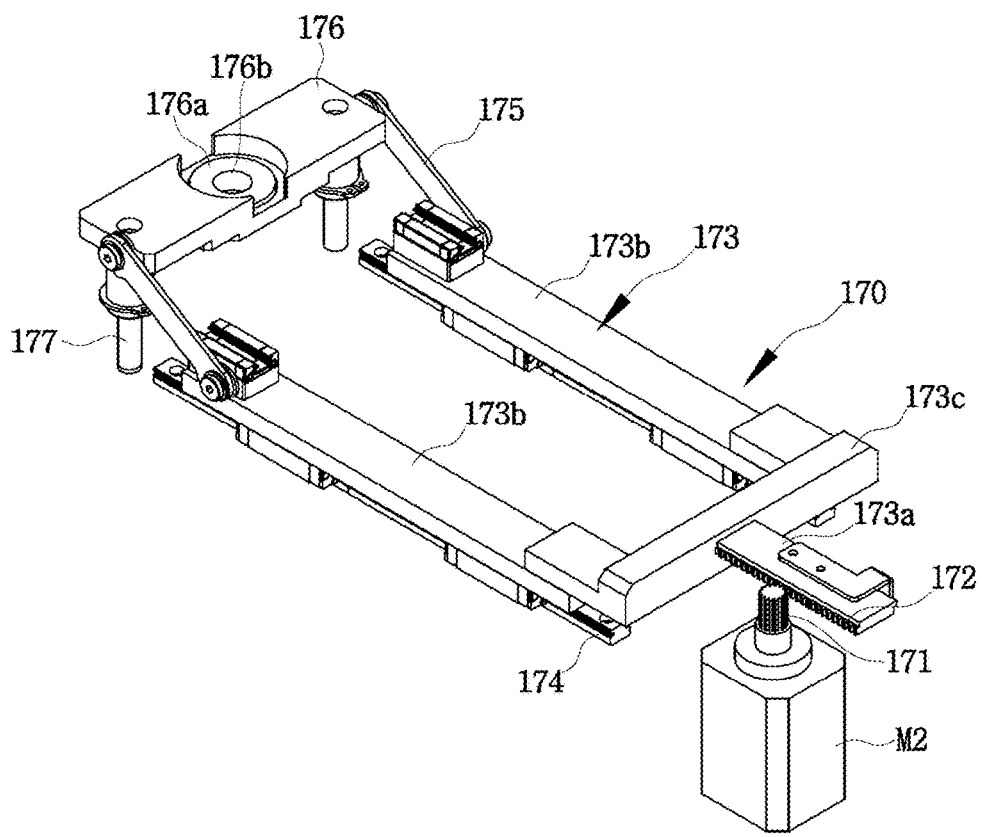
FIG. 6 is a perspective view for describing a configuration of a lifting unit that releases a bolt by moving the vacuum gripper upward in the automatic bolt fastening device according to the embodiment of the present disclosure.
Figure 7:
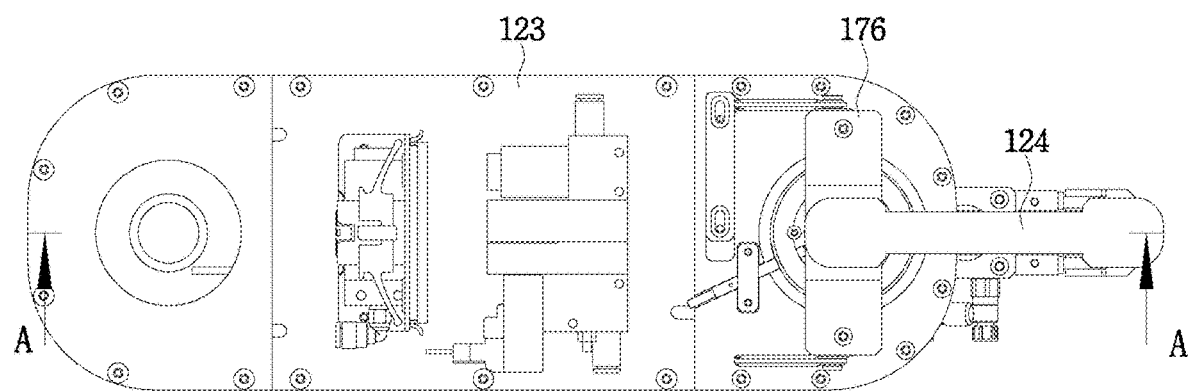
FIG. 7 is a plan view of the lower arm in which the vacuum gripper and the jaw gripper are installed in the automatic bolt fastening device according to the embodiment of the present disclosure.
Figure 8:
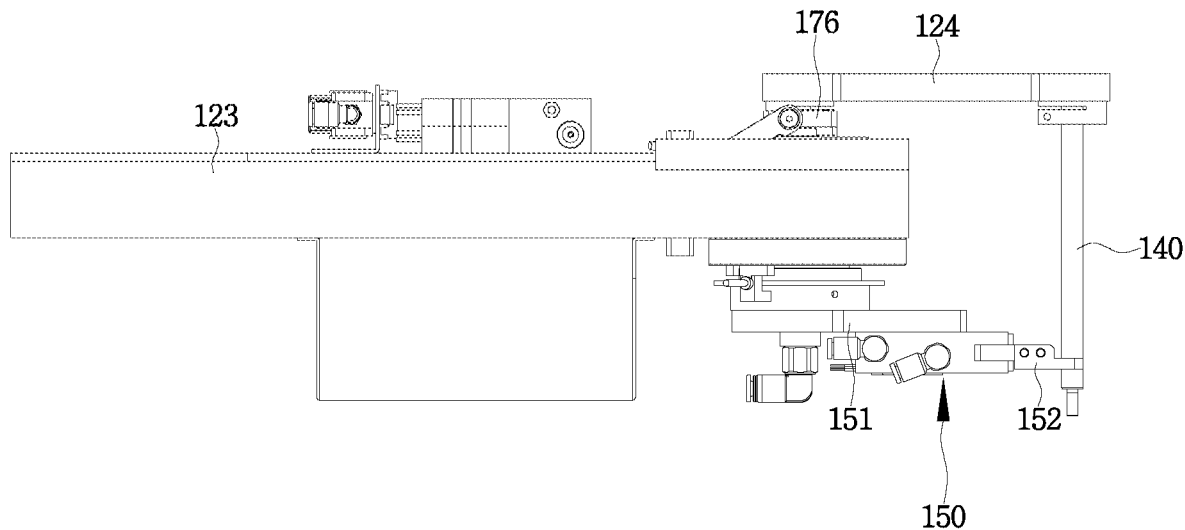
FIG. 8 is a side view of the lower arm in which the vacuum gripper and the jaw gripper are installed in the automatic bolt fastening device according to the embodiment of the present disclosure.

As illustrated in FIG. 6, the lifting unit 170 includes a pinion 171 installed in a shaft of a second motor M2, a rack 172 meshing with the pinion 171 to linearly move, a slide member 173 coupled to the rack 172 to linearly move in the forward-rearward direction, a rail 174 guiding the slide member 173 to slide, a link joint 175 having one end portion hinged on and coupled to the tip portion of the slide member 173, a lifting body 176 hinged on and coupled to the other end portion of the link joint 175, and lifting the auxiliary arm 124 while moving upward when the slide member 173 moves forward and moving downward when the slide member 173 moves rearward, and a pair of right and left guide rods 177 vertically coupled to a lower side of the lifting body 176 to guide lifting of the lifting body 176.

In this way, according to the configuration including the lifting unit 170, when the rack 172 is moved forward by rotating the shaft of the second motor M2 and the pinion 171 coupled thereto, the slide member moves forward together with the rack 172, and the lifting body 176 hinged on and coupled to the link joint 175 in the tip portion of the slide member 173 moves upward. At this time, the guide rod 177 guides the lifting body 176 to stably move upward without moving forward. Here, it is possible to solve the problem. The lifting body 176 may be inclined rightward or leftward due to the configuration including the pair of right and left guide rods 177. Consequently, the guide rod 177 may not move upward and downward since the guide rod 177 may be caught in a hole into which the ball spline 180 is inserted. In this manner, the auxiliary arm 124 supported in a state where a rear end portion is mounted on a mounting groove 176a formed on the upper surface of the lifting body 176 moves upward, and the vacuum gripper 140 installed in the tip portion of the auxiliary arm 124 also moves upward.

In this configuration of the lifting unit 170, the vertical shaft 181 is inserted into the tip portion of the lower arm 120 in a penetrating state of the vertical shaft 181 of the ball spline 180 vertically coupled to the lower side of the auxiliary arm 124 through a through-hole 176b formed in the mounting groove 176a of the lifting body 176. In this manner, even when the auxiliary arm 124 is installed in a form where only a rear end portion is supported by the mounting groove (176a) of the lifting body (176), the lifting body (176) of the lifting unit (170) can move upward and downward without sagging of the tip portion.

In addition, a shape of the slide member 173 can be noted in the configuration of the lifting unit (170). The slide member 173 includes a rack coupler 173a coupled to the upper surface of the rack 172, a right-left enlarged portion 173c coupled to the tip portion of the rack coupler 173a in a long form in the rightward-leftward direction, and a pair of sliding units 173b respectively coupled to a left end portion and a right end portion of the right-left enlarged portion 173c, and formed in the forward-rearward direction in a state where the sliding units 173b are widely separated from each other. The rail 174 the link joint 175, and the guide rod 177 are provided in pairs on a right side and a left side to correspond to the sliding units 173b.

In this way, when the slide member 173 is widely open rightward and leftward by the right-left enlarged portion 173c and the pair of sliding units 173b and is in a state of being supported by the rail 174, there is an advantage in that the slide member 173 is more stably balanced when moving forward and rearward. Moreover, there is another advantage as follows. Even when the first motor M1 and the third motor M3 which respectively provide the power to the vacuum gripper 140 and the jaw gripper 150 are gathered and arranged in the center of a space between the pair of sliding units 173b separated from each other, a dead edge space can be actively utilized while avoiding an interference problem caused by the arrangement.

With regard to the above-described configuration of the lifting unit 170, a configuration may be adopted as follows. The second motor M2 may be installed under the rear end portion of the auxiliary arm 124 to move the vacuum gripper 140 upward and downward, and the auxiliary arm 124 may be simply moved upward and downward by a screw and a nut. Nevertheless, a complicated and inefficient configuration is adopted as follows. The second motor M2 is installed at a location away from the rear end portion of the auxiliary arm 124, and the power transmission system adopts the pinion 171, the rack 172, the slide member 173, the link joint 175, and the lifting body 176. However, this configuration is an optimized configuration in order to eliminate the interference problem with the upper arm 130 and to minimize a gap between the lower arm 120 and the upper arm 130 by lowering an operation height of the auxiliary arm 124 and the vacuum gripper 140 as much as possible.

The bolt fastener 160 is installed in the tip portion of the upper arm 130 in a form of a vacuum suction pipe. The bolt fastener 160 vacuum-suctions the bolt gripped by the vacuum gripper 140, and is moved to the assembly line in the state by the upper arm 130. Thereafter, the bolt fastener 160 fastens the bolt to the workpiece located on the assembly line. In the present disclosure, the bolt fastener (160) moves to the bolt feeder, and no longer picks up the bolt. The bolt fastener 160 moves immediately after receiving the bolt from the intermediately interposed jaw gripper 150, and is in charge of fastening the bolt to the workpiece. In this manner, it is possible to save a time for the bolt fastener 160 to move a long distance between the workpiece and the bolt feeder located on the assembly line, and a time for the bolt fastener 160 to be exactly located in the bolt feeder to pick up the bolt.

FIGS. 11A to 11L sequentially illustrate pickup and movement of the bolt by the vacuum gripper 140, intermediate gripping and transfer of the bolt by the jaw gripper 150, and movement and fastening of the bolt to the bolt fastener 160. In particular, as illustrated in the drawings, while the bolt fastener 160 fastens the preceding bolt, the vacuum gripper 140 and the jaw gripper 150 cooperate to pick up the bolt from the bolt feeder and transport the bolt. Thereafter, both of these await at a standby position so that the bolt can be immediately transferred to the bolt fastener 160. When the preceding bolt is completely fastened, the bolt fastener 160 causes the jaw gripper 150 to immediately pick up the bolt waiting at the standby position. It can be noted that the bolt fastener 160 is operated to fasten the bolt.

In addition, detailed operations and actions which are performed by the jaw gripper 150 between the vacuum gripper 140 and the bolt fastener 160 can be noted. The jaw gripper 150 smoothly performs a role of gripping and intermediately transferring the bolt between the vacuum gripper 140 and the bolt fastener 160 which vacuum-suction the bolt as illustrated in FIGS. 11D to 11K. Furthermore, the jaw gripper 150 not only performs a rotational operation to avoid the interference with the vacuum gripper 140, but also widely opens the jaws up to 180 degrees. This avoidance operation is also performed by the vacuum gripper 140 when the jaw gripper 150 is operated.

Hitherto, the preferred embodiments of the present disclosure have been described. However, the present disclosure can adopt various changes, modifications, and equivalents. It is clear that the present disclosure can be applied in the same manner by appropriately modifying the above-described embodiment. Therefore, the above-described contents do not limit the scope of the present disclosure determined by the appended claims.

What is claimed is:

1. An automatic bolt fastening device capable of fastening a bolt to a workpiece located on an assembly line by receiving the bolt from a bolt feeder, comprising:
    a main body frame;
    a lower arm installed in the main body frame to be rotatable in a rightward-leftward direction;
    a gripper installed in a tip portion of the lower arm to pick up the bolt from the bolt feeder;
    an upper arm installed in the main body frame on an upper side of the lower arm to be rotatable in the rightward-leftward direction; and
    a bolt fastener installed in a tip portion of the upper arm to be movable upward and downward, and capable of fastening the bolt to the workpiece located on the assembly line after being moved to the assembly line by the upper arm in a state where the bolt fastener vacuum-suctions the bolt picked up by the gripper,
    wherein a process of picking up the bolt from the bolt feeder by the gripper and a process of fastening the bolt to the workpiece by the bolt fastener are independently and simultaneously performable,
    wherein the gripper includes a vacuum gripper installed in a tip portion of an auxiliary arm installed on an upper surface of the tip portion of the lower arm to be rotatable in the rightward-leftward direction, and capable of vacuum-suctioning the bolt of the bolt feeder, and a jaw gripper installed on a lower surface of the tip portion of the lower arm, and capable of transferring the bolt to the bolt fastener by causing a pair of jaws provided in the tip portion of the lower arm to grip the bolt vacuum-suctioned by the vacuum gripper.

2. The automatic bolt fastening device of claim 1, wherein the auxiliary arm is rotatable in the rightward-leftward direction by receiving a driving force of a first motor in a state where the auxiliary arm is supported by the tip portion of the lower arm to be movable upward and downward by a ball spline vertically coupled to a lower side of the auxiliary arm.

3. The automatic bolt fastening device of claim 2, further comprising:
    a buffer spring that elastically supports the ball spline.

4. The automatic bolt fastening device of claim 2, further comprising:
    a lifting unit that releases the bolt by lifting the vacuum gripper in a state where the jaw gripper grips the bolt vacuum-suctioned by the vacuum gripper,
    wherein the lifting unit includes a pinion installed in a shaft of a second motor, a rack engaging with the pinion to linearly move, a slide member coupled to the rack to linearly move in a forward-rearward direction, a rail guiding the slide member to slide, a link joint having a first end portion hinged on and coupled to a tip portion of the slide member, a lifting body hinged on and coupled to a second end portion of the link joint, and capable of lifting the auxiliary arm while moving upward when the slide member moves forward and moving downward when the slide member moves rearward, and a guide rod vertically coupled to a lower side of the lifting body to guide lifting of the lifting body.

5. The automatic bolt fastening device of claim 4, wherein the slide member includes a rack coupler coupled to an upper surface of the rack, a right-left enlarged portion coupled to a tip portion of the rack coupler elongate in the rightward-leftward direction, and a pair of sliding units respectively coupled to a left end portion and a right end portion of the right-left enlarged portion and formed to be elongate in the forward-rearward direction in a state where the sliding units are separated from each other,
    wherein the rail, the link joint, and the guide rod are provided in pairs on a right side and a left side to correspond to the sliding units, and
    wherein the first motor and a third motor which respectively provide power for the vacuum gripper and the jaw gripper are arranged in a space between the pair of sliding units separated from each other.

6. The automatic bolt fastening device of claim 1, wherein the upper arm and the lower arm include articulated arms that are respectively bendable.

\* \* \* \* \*